United States Patent [19]
Sturman et al.

[11] 3,743,266
[45] July 3, 1973

[54] ENERGY ABSORBING ISOLATION SYSTEM

[75] Inventors: Oded E. Sturman, Northridge; George C. Roberts, Venice, both of Calif.

[73] Assignee: Inca Manufacturing Corporation, Inglewood, Calif.

[22] Filed: Aug. 26, 1971

[21] Appl. No.: 175,186

[52] U.S. Cl. .................................. 267/31, 267/162
[51] Int. Cl. ............................................ B60g 11/34
[58] Field of Search ....................... 267/31, 36, 162, 267/3; 293/86, 89; 188/196

[56] References Cited
UNITED STATES PATENTS
2,708,110  5/1955  Clay ................................... 267/162
3,498,488  3/1970  Wildey et al ...................... 267/162

Primary Examiner—James B. Marbert
Attorney—Leonard Golove, Marvin H. Kleinberg et al.

[57] ABSTRACT

This invention relates to a novel energy absorbing isolation device which will absorb and dissipate a major portion of the energy associated with vehicle collisions. The present invention comprises a cylindrical tube, housing a plurality of Belleville spring washers which are compressed on impact by the wide portion of a movable shaft having a relatively wide portion and a relatively narrow portion. The relatively narrow portion of the shaft advances axially into the cylindrical tube as the Belleville washers are compressed. The energy of impact is absorbed and dissipated by compression of the Belleville washers and by interactions between the washers, the inside surface of the cylindrical tube, and the narrow portion of the shaft.

27 Claims, 3 Drawing Figures

Patented July 3, 1973 3,743,266
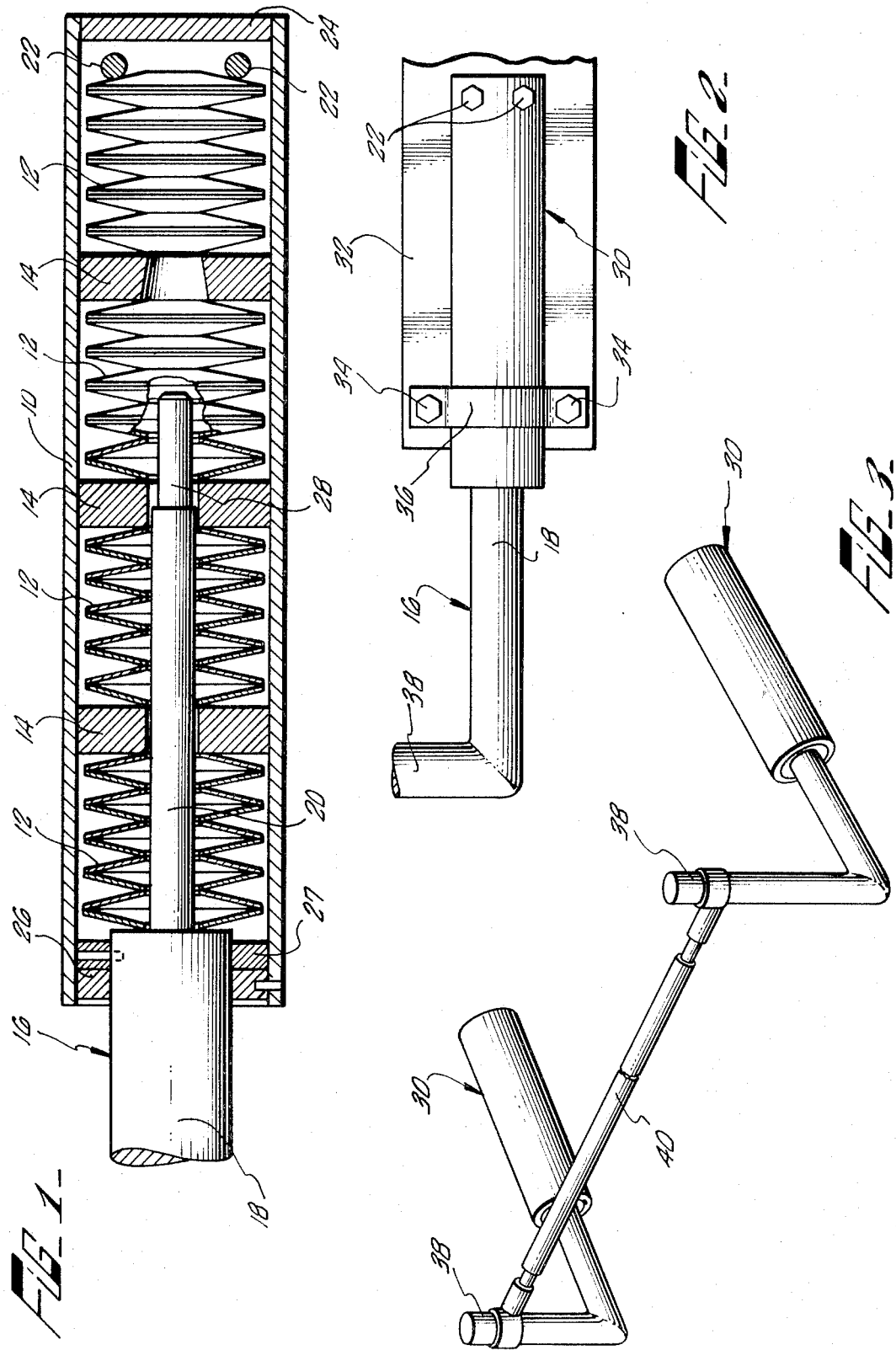

ENERGY ABSORBING ISOLATION SYSTEM

This invention relates to an energy absorbing isolation device for use with a moving vehicle and more particularly to a shock absorbing system which will absorb and dissipate a major portion of the energy associated with vehicle collisions.

Referring to U.S. Pat. No. 3,313,567, for a "Belleville Spring Biased Bumper," issued to O. E. Sturman, the co-inventor of the present improvement, it is pointed out therein that moving vehicles in a situation of high impact, that is a collision or other accident, suffer relatively large damage and that serious injury to passengers frequently result therefrom. In the prior Sturman patent, the use of a plurality of Belleville washers to absorb some of the energy necessarily created by the collision is discussed.

The present invention is basically an improved device using the Belleville springs discussed in the prior Sturman patent. The improvements over the prior Sturman patent lie in providing an energy dissipative device that allows energy to be dissipated in a more economical and practical manner.

The improvement maximizes the amount of energy dissipated between the Belleville springs and both the center shaft and the inside surface of the cylindrical tube. Hence, the total energy dissipating device can be made shorter in length, lighter in weight and less expensive to fabricate.

The second principal area of improvement over the prior Sturman device is that the present invention is adapted to protect the vehicle and its passengers from collisions occurring at an angle to the normal direction of movement of the vehicle. As was the case above in connection with the first area of improvement, the earlier device is capable of absorbing collision produced forces either in, or at a relatively small angle to, the normal direction of motion of the vehicle. The present improved device increases substantially the angle of collisions which can be accomodated and increases the efficiency of the device with respect to such angled collisions.

An additional improvement over the prior Sturman patent lies in the consistancy in performance and repeatibility. The device described herein, by design, can be made such that it can be cycled hundreds of times with no degradation in performance or energy dissipative ability.

A still further improvement provided by the present invention over the prior Sturman device is that the automatic holding device, which retained the Belleville springs in their compressed position to avoid rebound of the spring washers, has been eliminated since the increased energy absorbing capability of the present invention reduces the need for this protection to the point where this protective feature can be eliminated.

Briefly described, the present invention comprises a cylindrical tube which houses a plurality cf Belleville springs mounted face to face and back to back. A movable shaft having a relatively wide portion of relatively large diameter, and a relatively narrow portion of relatively small diameter is introduced into the cylindrical tube such that the relatively wide portion contacts the plurality of Belleville washers at the end of the stack of washers such that force applied to the shaft will be transmitted to the washers. The stack of Belleville washers is divided into a plurality of segments by a plurality of sliding rings which are introduced into the cylindrical tube at intervals.

The relatively narrow portion of the shaft is adapted to fit into the sliding rings, which serve as a guide for the shaft as well as other functions which will be discussed below. The cylindrical tube may be either closed at the end opposite the shaft or the Belleville washers may be restrained from movement outside the cylindrical tube by relatively heavy bolts which can also be used to couple the energy absorbing structure to the vehicle frame.

Upon impact, the shaft exerts force on the Belleville washers which in turn compress, absorbing energy, and which deform such that the inner diameter of the washers decreases and the outer diameter of the washers increases. Frictional forces between the narrow portion of the shaft and the inner surface of the Belleville washers account for some energy dissipation. Frictional forces between the outer surface of the Belleville washers and the cylindrical tube account for still more energy dissipation. Frictional forces between adjacent Belleville washers account for still more energy dissipation and, depending upon the impact forces, movement of the narrow portion of the shaft against the compressed washers may cause the washers to shear off part of the metal composing the narrow portion of the shaft. Movement of the Belleville washers against the cylindrical tube also may cause removal of metal from the tube. In both of these cases, removal of metal, when it occurs, dissipates a very substantial portion of the energy applied to the device.

In addition to the energy absorbing means described above, it is believed that the narrow portion of the shaft exhibits flexibility under relatively heavy and angled loads, and that this flexibility results in still further frictional and shear forces which assist in dissipating additional energy.

The effective operation of the present device under relatively large side or angled loads is accomplished by a number of means.

The relatively wide portion of the shaft is held in place by a front ring which is fixed to the shaft. When the springs are compressed by movement of the shaft, the fixed ring also moves providing both support and positioning of the center shaft.

Additionally, the sliding guide rings maintain the position of the shaft relative to the cylindrical tube. Other structural elements also assist in side load accommodation as will be pointed out in detail hereafter. In operation, it has been found that the present invention tends to function more efficiently under side loads than under direct frontal impacts. It is believed that this advantage is due to the fact that frictional forces are increased by the increase in force normal to the direction of motion of the shaft.

It is therefore an object of the present invention to provide an improved energy absorbing device for moving vehicles.

Still another object of the invention is the provision of an improved energy dissipating and absorbing device which lessens the effect of impact on the vehicle and on the passengers therein.

Another significant advantage of the present invention is that it can be applied to motor vehicles having an already existing bumper system. A novel method of attachment of the shock absorbing system to existing vehicles, which minimizes the amount of additional weight which must be added to the vehicle and which does not present an unpleasing appearance, has been developed.

To achieve this result, each of the novel shock absorbing units described above is attached directly to the frame (or equivalent) of the vehicle below the level of the existing bumper. The movable shaft, referred to above, is extended beneath the bumper to a point several inches in front of the furthest projection of the vehicle. The shaft itself is bent to form a right angle, and is mounted such that one of its sides serves as a vertical guard. One of the shock absorbing units is placed on each side of the vehicle and a cross bar is attached between the vertical guard members through swivel joints which are used so that each shock absorbing unit may operate independently. The cross bar itself is a telescoping member to prevent deformation under minor impacts. Since impact forces are applied directly to the shock absorbing units, no relatively heavy transmission members are required and the added weight to the vehicle is minimized.

Still another object of this invention is to provide an improved energy absorbing device in which a relatively large portion of the energy produced by an impact is dissipated rather than stored.

A further object of the invention is to provide an energy absorbing device which functions at a relatively large angle of impact.

A still further object of the present invention is to provide a vehicle bumper system which provides all of the advantages set forth above.

Another and still further object of the present invention is to provide a novel method of attachment of a vehicle bumper system to an existing motor vehicle which requires no alteration of the present structure of the vehicle, which adds minimum weight to the vehicle, and which does not substantially impair the appearance of the vehicle.

These and other advantages and further objects of the invention will be apparent to those skilled in the art from the following specification and the appended drawings in which:

FIG. 1 is a sectional view of the energy absorbing system of the present invention;

FIG. 2 is a plan view of the shock absorbing system showing the system mounted on the frame of the vehicle;

FIG. 3 is a perspective view of a pair of shock absorbing systems as used on a vehicle together with the cross member connecting the shock absorbing units.

Turning now to FIG. 1, the details of construction of a novel shock or energy absorbing system are shown. A cylindrical tube 10 houses a plurality of Belleville springs 12, mounted face to face and back to back. The springs 12 are divided into segments by a plurality of sliding rings 14. A movable shaft 16, having a relatively wide portion of relatively large diameter 18 and a relatively narrow portion of relatively small diameter 20, is introduced into the cylindrical tube 10, such that the relatively wide portion 18 contacts the plurality of Belleville washers 12 at one end of the stack of washers 12. Thus, force applied to the shaft 16 will be transmitted to the washers 12.

The opposite end of the stack of Belleville washers 12 is restrained by a pair of bolts 22, which may also be used to assist in mounting the energy absorbing system to a vehicle. In the embodiment shown, a relatively light end member 24 seals the opposite end of the cylindrical tube 10, however the bolts 22 could be eliminated if the member 24 were used to restrain the washers 12. In this case, the member 24 would have to be of very substantial strength. The relatively wide portion 18 of the shaft 16 is maintained in its position even under very severe angled impacts by a front ring 27, which is pinned to the shaft 16, together with the plurality of sliding rings 14. The stationary ring 26 is pinned to the tube body 10. This stationary ring 26 retains the Belleville springs and prevents the springs from exiting the tube after impact or cycling. In addition, the ring 26, as a retainer, allows the plurality of springs 12 to be preloaded or compressed at assembly. Preload of springs 12 shapes the dissipative force curve. The sliding ring 27 is adapted to contact the wide portion of shaft 16 with the cylindrical tube 10, whereas the plurality of sliding rings 14 is adapted to guide the relatively narrow portion 20 of the shaft 16.

As shown, the end of the relatively narrow portion 20 of the shaft 16 is provided with a bevelled surface to allow easy entry into the sliding rings 14. One or more of the sliding rings 14 is also biased to further assist in the introduction of the end of the narrow portion 20 into the sliding rings 14.

A portion 28 of the narrow portion 20 is relieved as shown (exaggerated) for reasons which will be explained fully below.

Turning now to FIG. 2, the shock absorbing system is shown mounted to a portion of the frame of a vehicle. The shock absorbing unit 30 is fixed to a portion of the frame of the vehicle 32 by a pair of bolts 34 which retain the unit 30 by means of a strap 36. The additional pair of bolts 22 further secures the unit 30 to the frame. As has been pointed out above, the bolts 22 are also used to retain the Belleville springs 12. The shaft 16 is shown having one end bent at a right angle. In use, the right angled portion 38 serves as a vertical guard for the vehicle body and is placed such that impact is received on the vertical portion. Forces applied to the vertical portion of the shaft 38 are, of course, transmitted to the Belleville springs 12, as has been described above.

FIG. 3 shows a pair of shock absorbing units 30 together with a cross member 40. As shown, a shock absorbing unit 30 is placed on each side of the vehicle and the cross bar 40 is attached to the vertical portions 38 through a swivel joint. These swivel joints permit each shock absorbing unit 30 to operate independently. The cross bar 40 is in fact a telescoping structure as shown, which prevents bending of the cross bar 40 when side loads are applied. As can be seen from FIG. 3, each end of the cross bar 40 is adapted to permit relative shortening or lengthening of the member 40 when forces require such contraction or elongation.

In operation, when a substantial force is applied to the shaft 18, the shaft 18 compresses the plurality of Belleville springs 12. During the compressive process kinetic energy is dissipated by both frictional interaction between Belleville springs 12 themselves, and also by frictional interaction between the inner diameter of the springs 12 and the central cylindrical shaft 20. Further, additional frictional interaction occurs between the outer diameter of the springs 12 and the cylindrical tube 10, which dissipates energy in a like manner. The amount of energy dissipation is controlled by selecting tube 10 and shaft 20 diameters, as the Belleville springs 12 expand on their outer diameter and constrict on their inner diameter when compressed. The amount of expansion is controllable by design of the spring, hence any degree of frictional interaction can be produced in the device, thus enabling the device to be fabricated to accommodate a wide range of energy dissipation requirements.

Frictional forces are further enhanced by the movement of the spring 12 with respect to both tube 10 and center cylindrical shaft 20. As the device is actuated and the Belleville springs 12 compress, they slide toward the restraining bolts 22, thereby affecting a sliding frictional interaction between tube 10, springs 12 and shaft 20.

The above description is applicable to the design of an energy dissipating device that can be cycled or actuated many times with no degradation in performance. Under certain conditions, it may be desirable to assemble a device that is extremely dissipative and which need not be cycled or actuated more than once, i.e. not resetting. This may be accomplished in this invention by designing the clearance between springs 12, tube 10 and shaft 20 such that both the tube 10 and shaft 20 are physically deformed when the device is actuated. Substantial amounts of energy may be dissipated through tube and shaft deformation.

In order to control the dissipation of energy, the narrow portion 28 of shaft 20 was introduced. Relief of the shaft 28 allows an even distribution of frictional interaction over the surface of the shaft 20. In addition, relief of the shaft 28 aids in locating the shaft 20 when it is undergoing movement through the springs 12, which occurs when external force is applied to shaft 18.

In other embodiments, the shaft can be of lesser diameter so that all energy dissipation takes place between the Belleville springs and the outer cylindrical tube. Alternatively, the outer tube can completely clear the expanding Belleville springs, and energy can be dissipated solely in the interaction between the shaft and the springs.

Other embodiments of the present invention, and modifications of the embodiments presented herein, may be developed without departing from the essential characteristics thereof. For example, shapes other than circular could be used for the tube, the Belleville springs and the central shaft. Alternative designs might include polygons of various shapes such as triangles, squares, rectangles or other, more complex shapes. Similarly the aperture in the springs and the shaft which is insertable in the springs may have a similar or even a different polygonal cross section. Accordingly, the invention should be limited only by the scope of the claims appended below.

What is claimed as new is:

1. An energy absorbing isolation device for receiving and dissipating a major portion of the energy associated with relatively high energy impact loads, said device comprising:
    a support member having a bore of cross sectional dimension $d_1$ extending therethrough;
    a plurality of Belleville spring washers having a maximum dimension $d_2$, less than $d_1$, adapted to be compressed and thereupon to expand, stacked axially within said bore, said dimensions $d_1$ and $d_2$ having a ratio such that, upon compression of said Belleville spring washers, the dimension $d_2$ approaches and exceeds the dimension $d_1$;
    a movable shaft axially positioned within said bore, adapted to receive high energy loads, and further adapted to advance within said bore in response to said loads;
    said shaft having a first portion of relatively large diameter and a second portion of relatively small diameter, said first portion positioned at one end of said stack of Belleville washers for compressing said washers upon advance of said shaft, said second portion positioned axially within said stack of Belleville washers and advancing with said first portion;
    whereby, upon compression of said washers, frictional contact is made between said outer periphery of said Belleville washers and the inner surface of said bore, and contact is made between said inner periphery of said Belleville washers and the surface of said second portion of said movable shaft.

2. Apparatus according to claim 1 in which said bore has a circular cross-section, said cross-sectional dimension is a diameter $d_1$, and in which said Belleville spring washers are circular and said maximum dimension is a diameter $d_2$.

3. Apparatus according to claim 1 in which said bore has a polygonal cross-section, said cross-sectional dimension is a length $l_1$ and in which said Belleville springs are correspondingly polygonal and said maximum dimension is length $l_2$, where $l_1$ corresponds to $d_1$ and $l_2$ corresponds to $d_2$.

4. Apparatus according to claim 1 further including a plurality of movable separation elements, said plurality dividing the plurality of Belleville spring washers into segments.

5. Apparatus according to claim 4 further including means coupled to said support member with said bore and to said movable shaft, together with said plurality of movable separation elements, for maintaining said movable shaft in a position substantially axial within said bore when said high energy loads are side loads.

6. Apparatus according to claim 5 in which the end of said second portion of said shaft is of smaller diameter than the remainder of said second portion of said shaft.

7. Apparatus according to claim 6 in which said end of said second portion of said shaft is bevelled and in which at least one of said separation elements is biased.

8. Apparatus according to claim 1 in which said Belleville washers have an inner opening with a minimum dimension of $d_3$ and said shaft has a maximum diameter of $d_4$, upon compression of said washers, the dimension $d_3$ approaches and can be less than $d_4$ for dissipating a substantial portion of the energy by frictional contact between the inner opening of said Belleville washers and said movable shaft.

9. Apparatus according to claim 1 wherein a substantial portion of energy dissipated is in frictional contact between the outer dimension of said Belleville washers and the inner dimension $d_1$ of said bore.

10. An automobile bumper utilizing the isolation device of claim 1 comprising:
    a pair of energy absorbing isolation devices, according to claim 1, mounted one on each side of the frame of the automobile;
    a telescoping cross bar pivotably mounted at each end thereof, to one of said movable shafts of said energy absorbing isolation devices.

11. An energy absorbing isolation device for receiving and dissipating a major portion of the energy associated with relatively high energy impact loads, said device comprising:
- a support member having a bore of circular cross-section extending therethrough;
- a plurality of Belleville spring washers stacked axially within said bore;
- said washers adapted, upon compression thereof to increase their outer diameter and decrease their inner diameter;
- a movable shaft axially positioned within said bore, adapted to receive high energy loads, and further adapted to advance within said bore in response to said loads;
- said shaft having a first portion of relatively large diameter and a second portion of relatively small diameter;
- said first portion positioned at one end of said stack of Belleville washers for compressing said washers upon advance of said shaft;
- said second portion positioned axially within said stack of Belleville washers and advancing with said first portion, whereby upon compression of said washers, frictional contact is made between said outer periphery of said Belleville washers and the inner surface of said bore and contact is made between said inner periphery of said Belleville washers and the surface of said second portion of said movable shaft.

12. An energy absorbing isolation device for receiving and dissipating a major portion of the energy associated with relatively high energy impact loads, said device comprising:
- a plurality of Belleville spring washers each having a central opening;
- a support means adapted to receive the axial stack of Belleville washers;
- a movable shaft axially positioned within said support means adapted to receive high energy loads and further adapted to advance within said support member in response to said loads;
- said shaft having a first portion of relatively large diameter and a second portion of relatively small diameter, said first portion positioned at one end of said stack of Belleville washers for compressing said washers upon advance of said shaft, said second portion positioned axially within said stack of Belleville washers and advancing with said first portion;
- whereby, upon compression of said washers, frictional contact is made between said central opening of said Belleville washers and the surface of said second portion of said movable shaft.

13. Apparatus according to claim 12 in which said shaft second portion has a circular cross-section, said cross-sectional dimension is a diameter $d_1$ and in which said Belleville spring washers have a circular central opening, and the normal dimensions of said central opening is a diameter $d_2$ where $d_2$ is normally greater than $d_1$, but upon compression of said Belleville spring washers, $d_2$ diminishes and becomes less than $d_1$.

14. Apparatus according to claim 12 in which said shaft second portion has a polygonal cross-section, said cross-sectional dimension is a length $l_1$ and in which the central opening of said Belleville springs is correspondingly polygonal having a normal dimension of length $l_2$ where $l_2$ is normally greater than $l_1$, but upon compression of said Belleville spring washers, $d_2$ diminishes and becomes less than $l_1$.

15. Apparatus according to claim 12 further including a plurality of movable separation elements, said plurality dividing the plurality of Belleville spring washers into segments.

16. Apparatus according to claim 15 further including means coupled to said support means and to said movable shaft, together with said plurality of movable separation elements, for maintaining said movable shaft in a position substantially axial within said support means when said high energy loads are side loads.

17. Apparatus according to claim 16 in which the end of said second portion of said shaft is of smaller diameter than the remainder of said second portion of said shaft.

18. Apparatus according to claim 17 in which said end of said second portion of said shaft is bevelled and in which at least one of said separation elements is biased.

19. An automobile bumper utilizing the isolation device of claim 12 comprising:
- a pair of energy absorbing isolation devices, according to claim 12, mounted one on each side of the frame of the automobile;
- a telescoping cross bar pivotably mounted at each end thereof to one of said movable shafts of said energy absorbing isolation devices.

20. An energy absorbing isolation device for receiving and dissipating a major portion of the energy associated with relatively high energy impact loads, said device comprising:
- a support member having a bore of cross-sectional dimension $d_1$ extending therethrough;
- a plurality of Belleville spring washers having a maximum uncompressed dimension $d_2$, less than $d_1$, adapted to be compressed and thereupon to expand to a dimension greater than $d_1$, stacked axially within said bore; and
- a movable shaft axially positioned within said bore adapted to receive high energy loads and further adapted to advance within said bore in response to said loads, for compressing said washers upon advance of said shaft,
- whereby, upon compression of said washers, frictional contact is made between said outer periphery of said Belleville washers and the inner surface of said bore.

21. An energy absorbing isolation device for receiving and dissipating a major portion of the energy associated with relatively high energy impact loads, said device comprising:
- a support member having a bore of circular cross-section extending therethrough;
- a plurality of Belleville spring washers having central openings stacked axially within said bore;
- said washers adapted, upon compression thereof, to increase their outer diameter and decrease their inner diameter;
- a shaft having a diameter less than the uncompressed inner diameter and greater than the compressed inner diameter of said washers axially positioned within said central openings adapted for movement relative to said support member in response to said loads; and means for compressing said washers in response to relative motion between said support member and said shaft resulting from applied high energy input loads, whereby upon compression of said washers, frictional contact is made between said central openings of said Belleville washers and the outer surface of said shaft.

22. An energy absorbing isolation device for receiving and dissipating a major portion of the energy associated with relatively high-energy impact loads, said device comprising:

a support member having a bore of circular cross-section extending therethrough;

a plurality of Belleville spring washers stacked axially within said bore;

said washers adapted, upon compression thereof to increase their outer diameter and decrease their inner diameter;

a shaft axially positioned within said bore adapted to advance within said bore in response to applied high energy loads;

said shaft having a first portion of relatively large diameter and a second portion of relatively small diameter;

said first portion positioned at one end of said stack of Belleville washers for compressing said washers upon motion of said shaft relative to said support member in an advancing direction;

said second portion positioned axially within said stack of Belleville washers and advancing with said first portion, whereby upon compression of said washers, frictional contact is made between said outer periphery of said Belleville washers and the inner surface of said bore.

23. An energy absorbing isolation device comprising:

a support member having a bore extending therein, a plurality of Belleville spring washers having central openings stacked axially within said bore, a shaft axially positioned to extend through said central openings and movable relative to said support member in response to relatively high-impact axial loading, means for compressing said washers in response to relative motion between said support member and said shaft resulting from axial loading, and guide means acting cooperatively with said shaft and said support member to maintain the axial position of and support said shaft when it is subjected to angled impacts.

24. Apparatus according to claim 23 wherein said guide means comprises at least a pair of spaced rings axially positioned to surround said shaft within said support member and adapted to interact with said shaft and said support member to position and support said shaft under angled impacts.

25. Apparatus according to claim 24 wherein one said ring is fixed to said shaft adjacent the foremost of said Belleville spring washers.

26. Apparatus according to claim 25 wherein each remaining said ring is unattached to either said shaft or said support member and is held in position by said Belleville spring washers.

27. An energy absorbing device comprising a stack of Belleville spring washers, a space of annular section for the stack of washers defined between inner and outer members which can move relatively to each other to compress the washers, the washers being capable when compressed of interfering with the opposing surface of at least one of the members.

* * * * *